United States Patent
Grindley

(10) Patent No.: US 6,508,029 B2
(45) Date of Patent: Jan. 21, 2003

(54) FISHING LURE WITH SPINNING MEMBER

(75) Inventor: John Grindley, Los Angeles, CA (US)

(73) Assignee: Catchy Tackle, LLC, Los Angeles, CA (US)

( * ) Notice: Subject to any disclaimer, the term of this patent is extended or adjusted under 35 U.S.C. 154(b) by 0 days.

(21) Appl. No.: 09/745,893

(22) Filed: Dec. 21, 2000

(65) Prior Publication Data

US 2001/0047610 A1 Dec. 6, 2001

Related U.S. Application Data

(60) Provisional application No. 60/175,936, filed on Jan. 13, 2000.

(51) Int. Cl.[7] .......................... A01K 85/00; A01K 85/12
(52) U.S. Cl. ................. 43/42.46; 43/42.21; 43/42.12
(58) Field of Search ............................ 43/42.46, 42.16, 43/42.21, 42.11, 42.19, 42.51, 42.12, 42.28, 42.09, 42.14

(56) References Cited

U.S. PATENT DOCUMENTS

| | | | | |
|---|---|---|---|---|
| 1,997,900 A | * | 4/1935 | Edwards | 43/42.15 |
| 2,002,135 A | * | 5/1935 | Barton | 43/17.6 |
| 2,450,253 A | * | 9/1948 | Parnell, Sr. | 43/42.12 |
| D162,741 S | * | 4/1951 | Lawhon | D22/128 |
| 2,574,702 A | * | 11/1951 | Moulton | 43/42.12 |
| 3,574,265 A | * | 4/1971 | Gibbons | 43/35 |
| 3,728,811 A | * | 4/1973 | Weimer | 43/26.2 |
| 3,909,973 A | * | 10/1975 | Fairbanks | 43/42.31 |
| 4,435,914 A | * | 3/1984 | Norman | 43/42.12 |
| 4,616,440 A | * | 10/1986 | Millroy | 43/42.12 |
| 5,197,220 A | * | 3/1993 | Gibbs et al. | 43/42.09 |
| 5,361,531 A | | 11/1994 | Rodrigues | 43/42.09 |
| 5,381,622 A | * | 1/1995 | Tregre | 43/42.31 |

* cited by examiner

Primary Examiner—Charles T. Jordan
Assistant Examiner—Tara M Golba
(74) Attorney, Agent, or Firm—John E. Wagner; Robert C. Smith

(57) ABSTRACT

A fishing lure is formed of three principal parts, including a bullet-shaped nose section having a reduced diameter part toward the rear including an axial bore, a rear or plug section having a reduced diameter forward section which is a press fit into the axial bore, and a centrally positioned spinner consisting of an annular member surrounding said reduced diameter part and having highly reflective fins secured to its exterior surface. Grooves formed in the ends of the spinner serve as bearing races and bearings are located in the grooves to aid in causing the spinner to rotate freely when the lure is pulled through the water causing the fins to spin and flash in the light. The plug section has a collar of approximately the same diameter as the exterior surface of the spinner and a slightly reduced diameter toward the rear to accommodate a plastic streamer. The collar prevents direct impingement of the water against the forward edge of the streamer. A second embodiment carries a spinner wheel on an axle perpendicular to the axis of the lure.

13 Claims, 2 Drawing Sheets

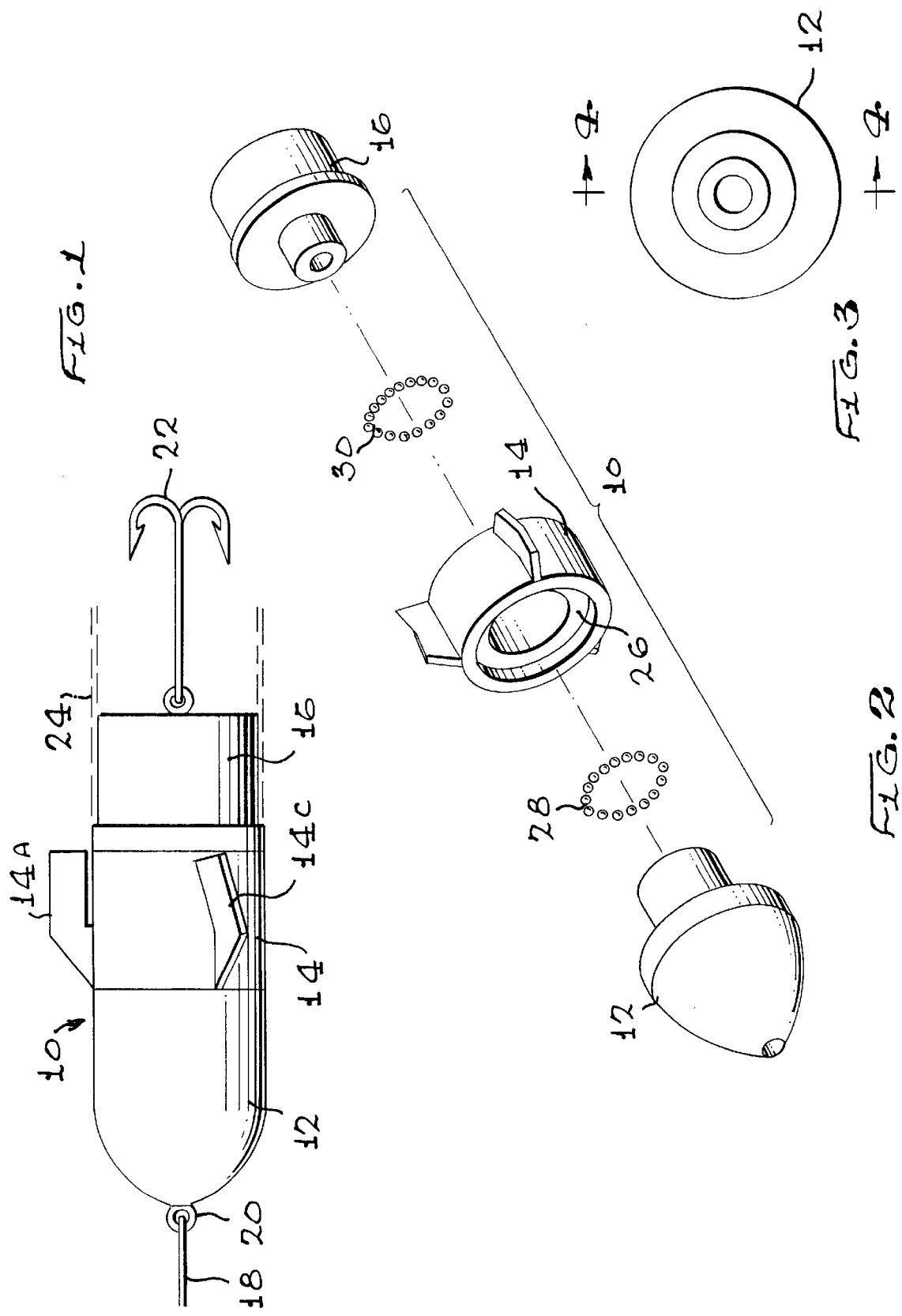

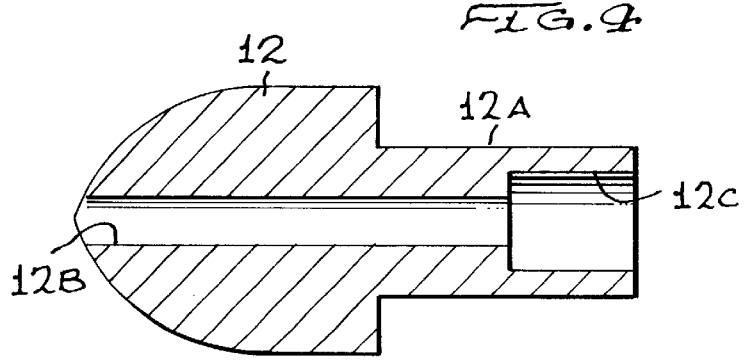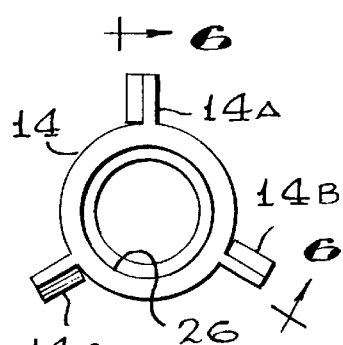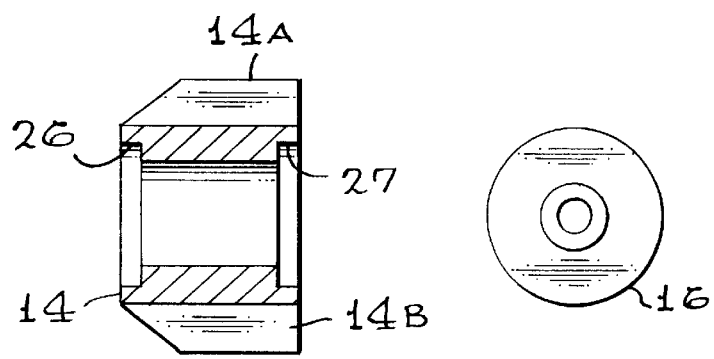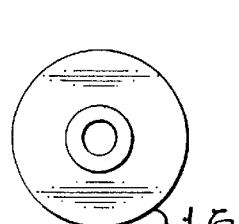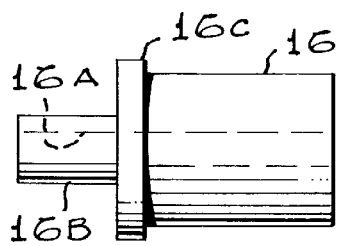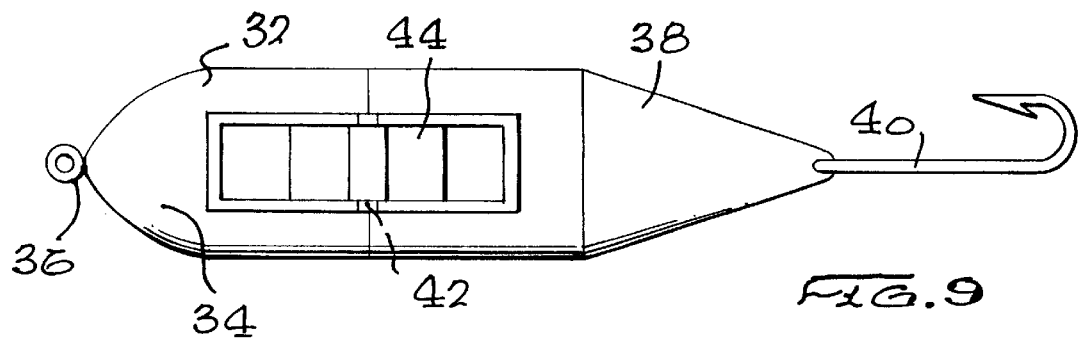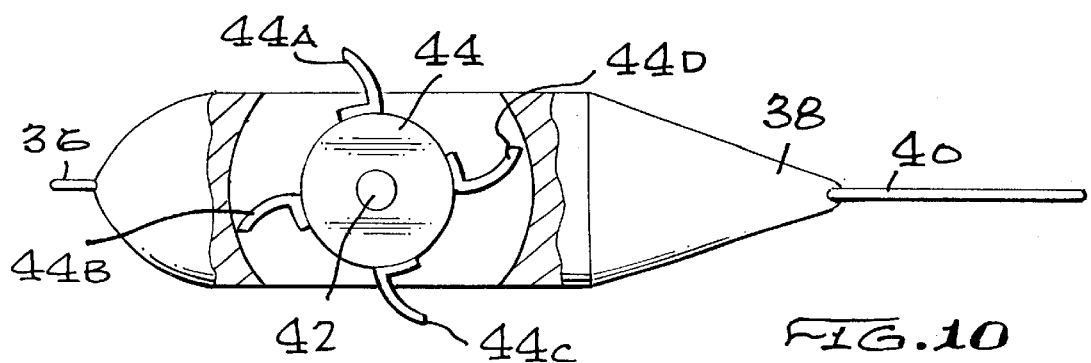

FISHING LURE WITH SPINNING MEMBER

REFERENCE TO RELATED APPLICATION

This non-provisional application claims priority to provisional application Serial No. 60/175,936 filed Jan. 13, 2000.

BACKGROUND OF THE INVENTION

This invention relates to fishing lures and more particularly to an active lure to be used primarily to catch fish of various sizes, including salt water game fish.

Anglers are always in search of a more effective fishing lure, one that catches more fish and or catches them more frequently, than other lures with which they are familiar. There have been many lure designs which attempt to attract fish through unusual action in the water, sometimes simulating an injured baitfish. Other lures have had lights, bright colors, or reflecting surfaces either with or without action in the form of erratic travel through the water.

There continues to be a need for an effective lure which exhibits flashing, movement, is reliable, and has long life even when used in the salt water environment.

A further need is for a simple design which fills all of the above needs and allows for change of skirts or other parts of the lure.

BRIEF SUMMARY OF THE INVENTION

Applicant's fishing lure has a generally cylindrical body with a bullet shaped forward section, a spinner section, including a plurality of blades having light reflecting surfaces which extend into the flow of water around the body such that the spinner section is caused to rotate with the movement of the body through the water and a rear body portion to which a flexible plastic member having streamers may be attached to simulate a small squid. Different kinds of sleeves with streamers may be used. As it is pulled through the water, the spinning blades cause sunlight to flash from the blades as well as producing cavitation, erratic movement and streams of bubbles in the water, all of which attract fish.

An alternate embodiment includes a paddle wheel mounted on an axle perpendicular to the direction of movement of the lure through the water having blades which flash in the sunlight and cause turbulence in the water.

BRIEF DESCRIPTION OF THE DRAWINGS

Applicant's invention may be more easily understood from consideration of the following drawings in which:

FIG. 1 is a side elevational view of my fishing lure;

FIG. 2 is an exploded view of the lure of FIG. 1;

FIG. 3 is a rear elevational view of the head portion of the lure of FIG. 1;

FIG. 4 is a sectional view taken along line 4—4 of FIG. 3;

FIG. 5 is a front-end view of the center or spinner portion of the lure;

FIG. 6 is a sectional view taken along line 6—6 of FIG. 5;

FIG. 7 is a forward end view of the rear or plug end part of the lure of FIG. 1;

FIG. 8 is a is a side elevational view of the rear or plug end part of FIG. 7;

FIG. 9 is a top plan view of an alternate embodiment of my invention; and

FIG. 10 is a side view, partly cut away, of the lure of FIG. 9.

DETAILED DESCRIPTION

Referring to FIG. 1, the lure 10 of the invention includes a forward or nose section 12, a center or spinner section 14 and a generally cylindrical rear or plug part 16. A fishing line 18, which may include a leader, is shown entering the axial passage through the lure at the front of nose section 12.

At the rear of plug section 16 is located a fishhook 22. Alternatively, a leader could be attached at the rear of plug 16 to one or more fishhooks. A streamer 24 of plastic material is normally stretched over the outside surface of plug section 16, including separate strips of a length somewhat longer than the lure, to conceal the hook 22 and simulate a small squid, for example. Such streamers 24 are well known in the art and are not illustrated in detail.

FIG. 2 is an exploded view of the lure of FIG. 1 and shows that the intermediate spinner section includes a number of blades, 14A, 14B and 14C, mounted on the tubular section of spinner 14. The blades are generally L-shaped with the foot of the L either integral with, or secured, to the cylindrical body of spinner 14, and the free end or leg of the blade angled with respect to the direction of flow through the water.

It is significant that the blades 14A, 14B, and 14C are not designed for minimum turbulence but rather to produce a degree of turbulence as the lure passes through the water. The blades are angular, with flat edges for irregular movement through the water and in fact can cause some erratic movement of the lure. For example, when trolling, the blades may cause the lure to actually broach momentarily. The blades as well as the lure are of shiny metal to provide flashing reflections with lure movement.

Also shown in FIG. 2 are the nose or forward part 12, the spinner 14 and the cylindrical rear or plug section 16 of lure 10. Spinner 14 includes, at each end, a circular bearing groove or race, of which only groove 26 is visible in this view. Groove 26 and the mating rear bearing groove 27 (FIG. 6) on the opposite end of spinner 14 constitute ball bearing races which confine sets of ball bearings 28 and 30: bearing set 28 being confined between nose section 12 and spinner 14 and bearing set 30 being confined between spinner 14 and plug part 16 when assembled. Nose section 12 extends through the center of spinner 14 and both sets of bearings also ride on a reduced diameter part 12A of nose section 12, as discussed below. The body parts 12 and 16 are preferably press fit together.

FIGS. 3 and 4 are rear elevational and sectional views, respectively, of nose section 12. On FIG. 4, it is clear that nose section 12 has a reduced diameter cylindrical section 12A, and also that a small diameter bore 12B runs through its axis. Depending upon the way the fishing line is secured to the lure, a section of line may run through bore 12B for attachment to one or more fish hooks 22 as shown in U.S. Pat. No. 5,361,531 issued Nov. 8, 1994, to John Rodriguez.

A second bore 12C, extending inwardly from the rear of part 12, mates with a part of plug 16 as discussed below.

FIGS. 5 and 6 are front elevational and longitudinal sectional views, respectively, of spinner 14, which is carried on the reduced diameter part 12A of nose member 12. Three blades 14A, 14B and 14C are formed on or secured to the outside of spinner 14. Each blade is undercut to a degree to permit it to be bent slightly into the water stream, which causes spinner 14 to spin as it is pulled through the water. Bearing races 26 and 27 are also shown.

FIG. 7 is a forward end view; and FIG. 8 is a side elevational view of plug member 16. Plug member 16 is generally cylindrical and includes a forwardly extending small diameter portion 16B, which is preferably press fitted into bore 12C. Also shown is an axial bore 16A, which is an extension of bore 12B of nose member 12. Plug 16 also includes a collar 16C which is of slightly larger diameter than the main body of plug 16 and which is preferably of the same diameter as spinner 14, other than its blades. The slightly reduced diameter of plug member 14 behind collar 16C makes it possible to attach a variety of streamers 24 to the lure 10 without having the skirt edge in the flow path.

The lure of FIGS. 1–8 flashes in the sunlight because of the spinning blades, but the blade action also causes the lure to move about. The combined action causes cavitation behind the lure leaving a trail of bubbles. All this is attractive to fish.

FIG. 9 is a top plan view of a second embodiment of the invention; and FIG. 10 is a side elevational view with a part of the side removed. The lure 32 includes a forward body part with a ring 36 for attaching a fishing line and a rear body part 38 including an opening for attaching a fishhook 40. Journaled at the junction between forward body part 34 and rear body part 38 is axle 42 which supports a paddle wheel 44 having a plurality of blades 44A, 44B, 44C, and 44D, which are somewhat curved for unidirectional rotation.

Other numbers of blades could be used, it only being necessary to insure that some blades are exposed to the water as the lure is pulled along and that there is always a predominance of blade area above or below the lure to cause rotation of the paddle wheel. Paddle wheel 44 will flash in the sunlight and will also cause turbulence in the water.

Larger or smaller lures are, of course, possible incorporating the features of this invention. For example, the lure of FIG. 1 has been made with a diameter of 0.750 in. A larger lure of this design which has been found effective for albacore has a 1.125 in. diameter with other dimensions proportionately larger. The smaller lure has a weight of approximately 5 oz. and the larger lure 18 oz.

The above-described embodiments of the present invention are merely descriptive of its principles and are not to be considered limiting. The scope of the present invention instead shall be determined from the scope of the following claims including their equivalents.

I claim:

1. A fishing lure adapted to be pulled through water comprising:
   a body having a bullet-shaped nose section and a smaller diameter extension having an internal bore;
   a rear plug section having a cylindrical surface and a forwardly extending extension seated in said bore; and
   a center section carried on said smaller diameter extension having external fins causing said center section and fins to rotate around said smaller diameter extension when said lure is pulled through the water.

2. A fishing lure as claimed in claim 1 further comprising a streamer adapted to fit over said cylindrical surface.

3. A fishing lure as claimed in claim 2 wherein said cylindrical rear plug surface includes a larger diameter collar to deflect water from said streamer.

4. A fishing lure as claimed in claim 1 wherein said nose section and said rear plug section are separate parts and include small diameter axial bores aligned to permit passage of a fishing line through said lure.

5. A fishing lure as claimed in claim 1 wherein a fishhook is secured to said rear plug section.

6. A fishing lure adapted to be pulled through water comprising:
   an elongated, generally cylindrical, housing including a bullet-shaped nose member including a smaller diameter extension having an internal bore extending along the axis of said housing;
   a generally cylindrical rear plug member including a forwardly extending cylindrical extension seated in said bore;
   a centrally positioned spinner member carried on said smaller diameter extension, said spinner member having a plurality of fins which extend outside the diameter of said nose member wherein said spinner member is caused to spin around said smaller diameter extension when pulled through the water;
   means for attaching a fishing line to said housing; and
   a fishhook secured to one of said housing or said fishing line.

7. A fishing lure as claimed in claim 6 wherein a streamer is secured to said rear plug member.

8. A fishing lure as claimed in claim 7 wherein said cylindrical rear plug member includes a larger diameter collar to deflect water from said streamer.

9. A fishing lure as claimed in claim 6 wherein said nose member and said cylindrical rear plug member each include small diameter axial bores aligned to permit passage of a fishing line.

10. A fishing lure as claimed in claim 6 wherein a fishhook is secured to said rear plug member.

11. A fishing lure as claimed in claim 6 wherein said spinner member includes bearing races and bearings are located in said bearing races and spaced radially outwardly from said smaller diameter extension.

12. A fishing lure as claimed in claim 6 further comprising means secured to said nose member for attachment of a fishing line.

13. A fishing lure adapted to be pulled through water comprising:
   an elongated, generally cylindrical, housing including a generally bullet-shaped nose section including a smaller diameter cylindrical extension having an internal cylindrical bore along the axis of said housing;
   a cylindrical rear plug section having a forwardly extending cylindrical portion which fits in said internal cylindrical bore;
   a centrally positioned generally cylindrical spinner member having an internal diameter slightly larger than the diameter of said cylindrical extension fitting over said cylindrical extension and having external fins formed to cause rotation of said spinner member when said lure is pulled through water, and annular grooves forming bearing races at each end of said spinner member;
   bearings in said bearing races spaced radially outwardly from said cylindrical extension; and
   a streamer adapted to fit over said cylindrical rear plug section.

* * * * *